United States Patent
Ishikawa et al.

(10) Patent No.: US 7,580,053 B2
(45) Date of Patent: Aug. 25, 2009

(54) LASER CONTROL CIRCUIT AND IMAGE FORMING APPARATUS

(75) Inventors: Daisuke Ishikawa, Mishima (JP); Koji Tanimoto, Shizuoka-ken (JP); Kenichi Komiya, Kawasaki (JP); Yuji Inagawa, Numazu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/062,627

(22) Filed: Apr. 4, 2008

(65) Prior Publication Data

US 2008/0186376 A1 Aug. 7, 2008

Related U.S. Application Data

(63) Continuation of application No. 11/063,544, filed on Feb. 24, 2005, now Pat. No. 7,369,151.

(51) Int. Cl.
  *B41J 2/47* (2006.01)
  *B41J 2/40* (2006.01)
  *B41J 27/00* (2006.01)
  *B41J 2/435* (2006.01)
(52) U.S. Cl. ............... 347/252; 347/255; 347/144; 347/241; 347/236
(58) Field of Classification Search ........... 347/252, 347/255, 241, 144, 236
See application file for complete search history.

(56) References Cited

U.S. PATENT DOCUMENTS

| 5,266,997 | A | 11/1993 | Nakane et al. |
| 5,963,344 | A | 10/1999 | Morita et al. |
| 6,839,078 | B2 | 1/2005 | Izumiya et al. |
| 2001/0048461 | A1 | 12/2001 | Noguchi |
| 2001/0051065 | A1* | 12/2001 | Togami ............... 400/76 |
| 2003/0063108 | A1* | 4/2003 | Isono et al. .......... 345/690 |
| 2004/0036762 | A1 | 2/2004 | Nihei et al. |
| 2004/0070663 | A1* | 4/2004 | Niito ................... 347/236 |
| 2005/0007443 | A1 | 1/2005 | Komiya et al. |
| 2005/0157159 | A1 | 7/2005 | Komiya et al. |

FOREIGN PATENT DOCUMENTS

JP    2001-091873 A    4/2001

* cited by examiner

*Primary Examiner*—Stephen D Meier
*Assistant Examiner*—Sarah Al-Hashimi
(74) *Attorney, Agent, or Firm*—Foley & Lardner LLP (57) ABSTRACT

An image data processing section subjects input image data to image processing, and outputs first to fourth image data. First to fourth pulse width modulation circuits are PWM circuits in each of which a plurality of reference positions are set in one pixel, and output pulses corresponding to the first to fourth image data. A synthesis circuit synthesizes the pulses output from the first to fourth pulse width modulation circuits, and a laser emits a light beam in accordance with the synthesized pulse.

6 Claims, 6 Drawing Sheets

LASER CONTROL CIRCUIT AND IMAGE FORMING APPARATUS

CROSS-REFERENCE TO RELATED APPLICATIONS

The present application is a divisional of U.S. application Ser. No. 11/063,544, filed Feb. 24, 2005, the entire contents of which are incorporated herein by reference.

BACKGROUND OF THE INVENTION

The present invention relates to image forming apparatuses such as a digital copying machine and a laser printer, in which a photosensitive drum is scanned and exposed by laser light beams to thereby form an electrostatic latent image on the photosensitive drum, particularly to a laser control circuit which controls a light emitting timing of laser.

As an image density reproduction system applied to an electrophotographic image forming apparatus using light beams, there has heretofore been a pulse width modulation system (PWM). In the pulse width modulation system, an image signal of each pixel of document image data is converted into a pulse width signal, and laser of an exposing unit is modulated by the pulse width signal. For example, when an image signal is FFh, a light beam is applied to the whole surface of one pixel on a photosensitive member. When the signal is 80 h, the light beam is applied to a region of a half of one pixel.

In the PWM, PWM circuits are provided for an odd-numbered pixel (odd pixel) and an even-numbered pixel (even pixel) of the image data, respectively. A PWM output timing is shifted by a half period between the odd and even pixels. Accordingly, the pixel can be output at an image clock rate which is twice a maximum rated operation speed of the PWM circuit. At this time, each pixel value of the document image data is set to a half value beforehand, and then input into each PWM. In a system in which two PWM circuits are provided in this manner, when the maximum rated operation speed (maximum input clock rate) of each PWM circuit is, for example, 100 MHz, a modulated pixel can be output at 200 MHz.

In this system, to enhance an image quality, an output pulse of each PWM circuit needs to be partially masked (deleted). A masking period corresponds to a latter half period of a clock input into each PWM circuit.

In a system in which the output pulse of the PWM circuit is partially masked, delay of a mask generation timing and fluctuation of a mask width are caused by influences of an operation delay time of a logic circuit for producing a mask, ambient temperature and the like. Therefore, a width of pixel is smaller than a width to be originally output, or conversely broadens. When precision of the pixel width drops, a quality of a printed image drops.

BRIEF SUMMARY OF THE INVENTION

According to one aspect of the present invention, there is provided a laser control circuit comprising: a clock generation circuit which generates a reference clock signal; a synchronous circuit which includes a beam detection circuit detecting a light beam scanned in a main scanning direction and supplying a horizontal synchronous signal, and which supplies a synchronous clock synchronized with the horizontal synchronous signal on a basis of the reference clock signal; a first pulse width modulation circuit which outputs a pulse having a width corresponding to image data of an odd pixel output from an image data processing section in synchronization with the synchronous clock on a basis of at least one of first and second reference positions, the image data processing section being constituted to subject input image data to image processing and to output image data of odd pixel and even pixel in parallel; a second pulse width modulation circuit which outputs a pulse having a width corresponding to the image data of the even pixel output from the image data processing section in synchronization with the synchronous clock on a basis of at least one of first and second reference positions; and a synthesis circuit which synthesizes the pulses output from the first and second pulse width modulation circuits.

DETAILED DESCRIPTION OF THE INVENTION

Embodiments of the present invention will be described hereinafter in detail with reference to the drawings.

Figure 1:
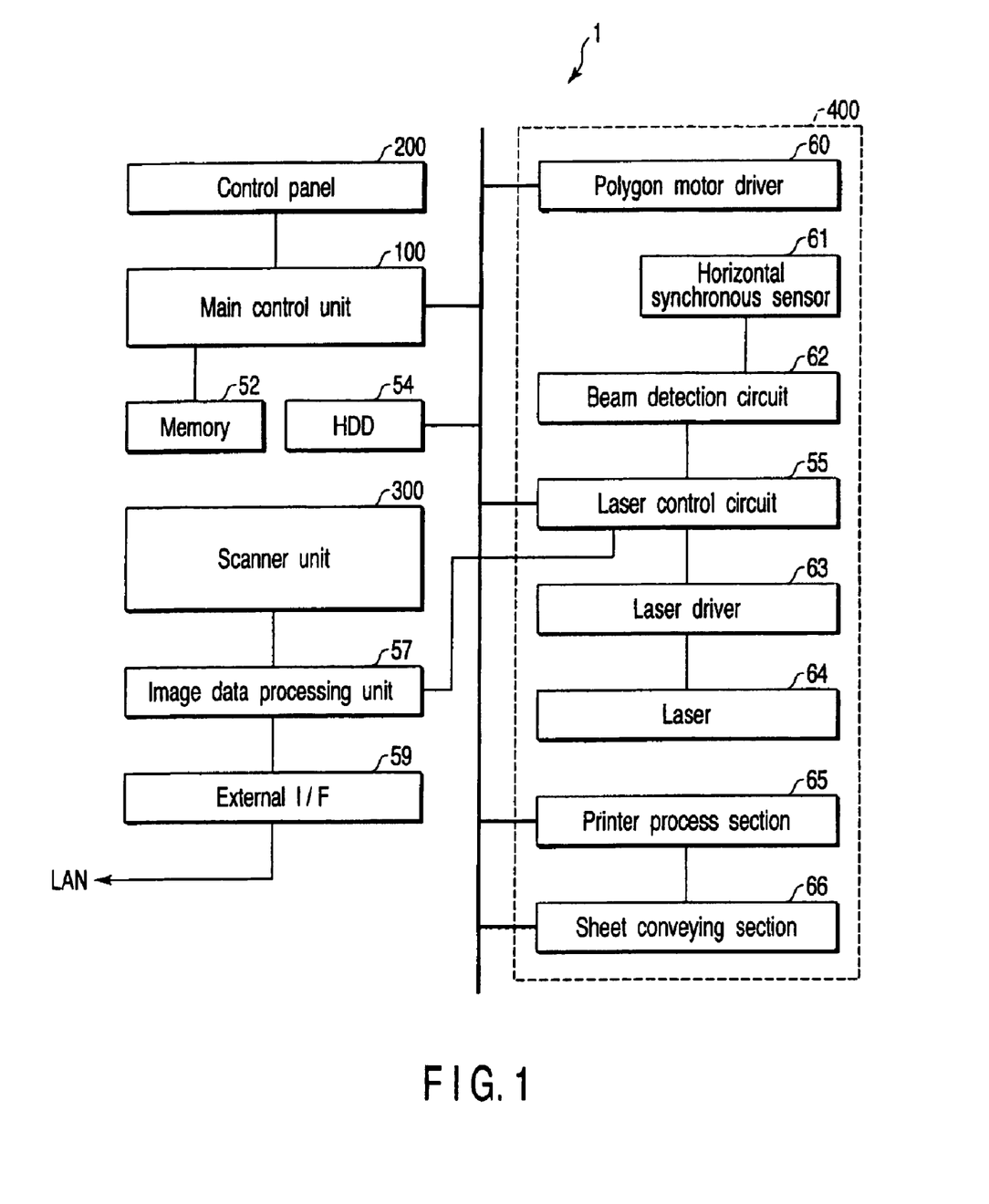
FIG. 1 is a block diagram showing a schematic constitution of an image forming apparatus to which the present invention is applied.

FIG. 1 is a block diagram showing a schematic constitution of an image forming apparatus to which one embodiment of the present invention is applied. An image forming apparatus 1 includes: a scanner unit 300 which reads a document image and which supplies image data corresponding to the document image; a printer unit 400 which forms an image on a sheet; a control panel unit 200 having a function of a user interface; and a main control unit 100 which generally controls the image forming apparatus 1 on the basis of a user instruction input via the control panel unit 200. The main control unit 100 receives document data from an external apparatus such as a personal computer via a network such as LAN and an external interface (I/F) 59, and the document data can be printed by the printer unit 400. The main control unit 100 is capable of transmitting image data read by the scanner unit 300 to the external apparatus including the personal computer from the external interface 59.

A memory 52 stores control information such as an initial value of a circuit element constituting each block of FIG. 1. An HDD 54 is used, for example, in a case where document image data having a large number of pages needs to be stored.

An image data processing unit 57 subjects the document image data supplied from the scanner unit 300, and image data supplied from the external interface 59, for example, to known shading correction, various filtering processes, gradation process, gamma correction and the like. The image data from the image data processing unit 57 is supplied to a laser control circuit 55.

The laser control circuit 55 performs pulse width modulation according to the present invention with respect to the image data supplied from the image data processing unit 57, and supplies a pulse signal having a width corresponding to the image data of each pixel to a laser driver 63. The laser driver 63 supplies a driving current to a laser 64 on the basis of a pulse signal supplied from the laser control circuit 55. The laser 64 generates a light beam in accordance with the driving current.

A polygon motor driver 60 is a driver which drives a polygon mirror motor (not shown) for rotating a polygon mirror (not shown) which scans the light beam generated from the laser 64. The main control unit 100 performs rotation start, rotation speed, and rotation speed switching with respect to the polygon motor driver 60. In a printer process section 65, an electrostatic latent image is formed on the surface of a photosensitive drum (not shown) on the basis of the light beam scanned by the polygon mirror, and a toner image is formed on the basis of the electrostatic latent image. The toner image is transferred and fixed onto a sheet supplied from a sheet conveying section 66.

Figure 2:
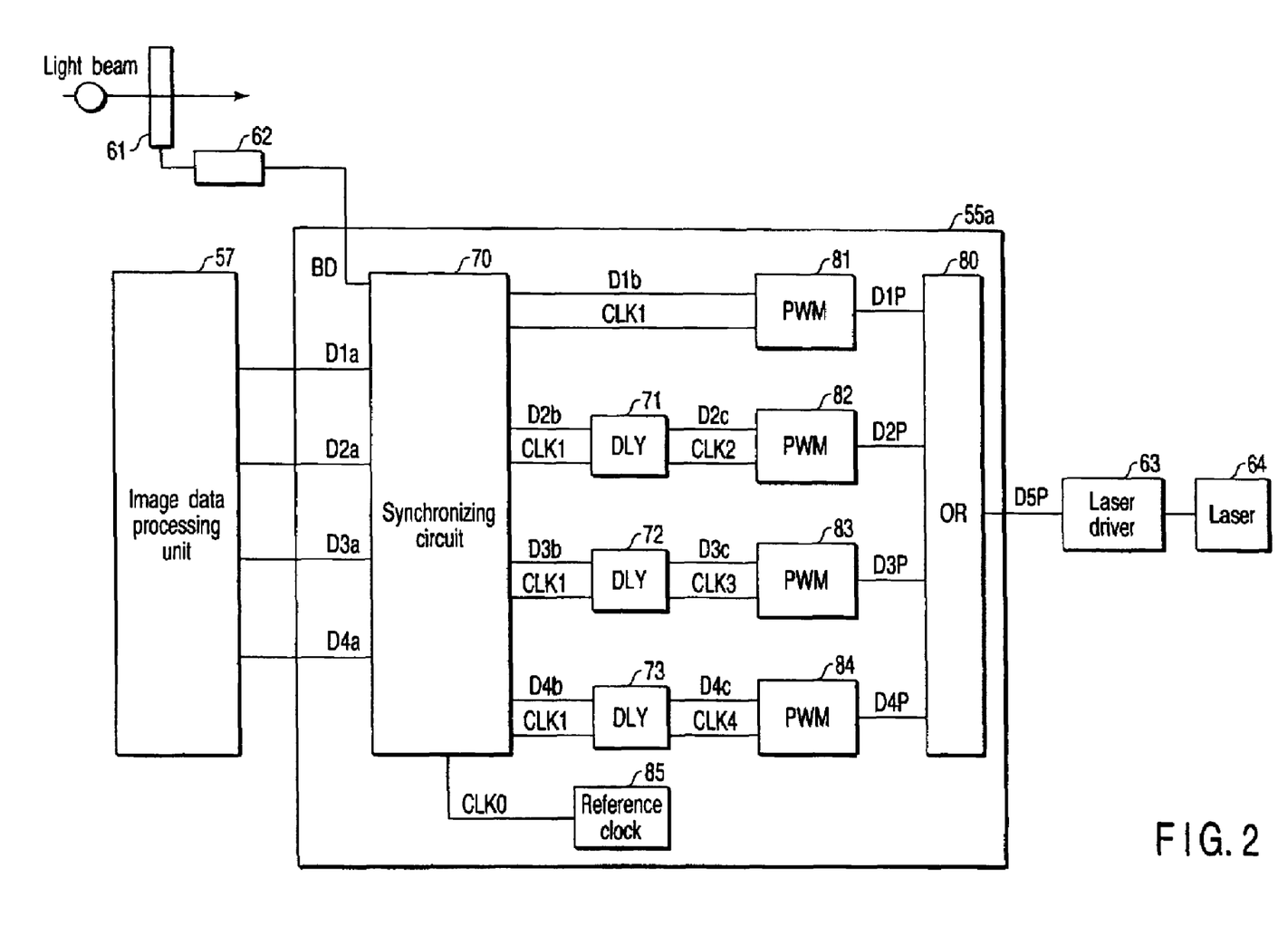
FIG. 2 is a block diagram showing a laser control circuit and a peripheral constitution according to one embodiment of the present invention.
Figure 3:
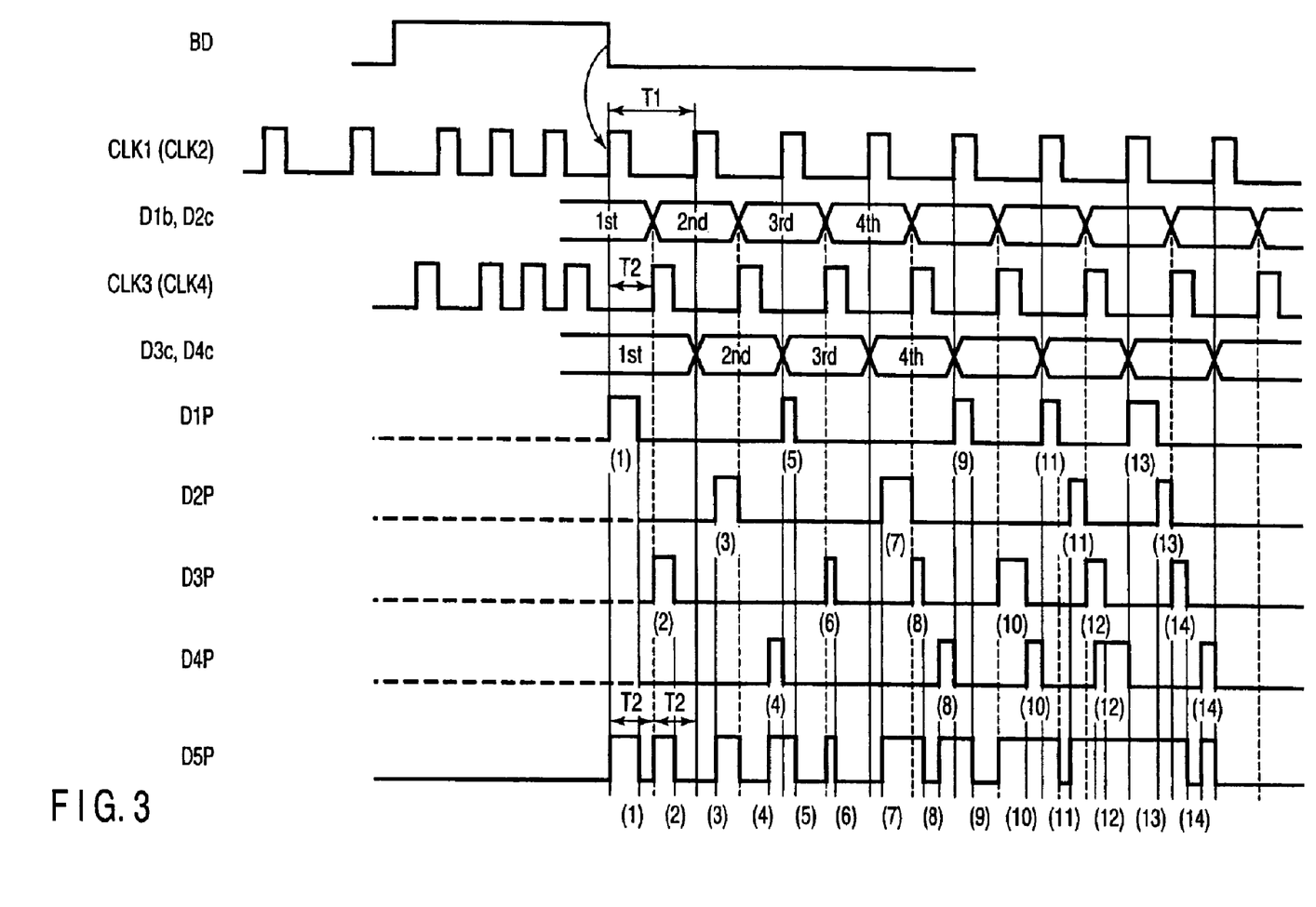
FIG. 3 is a time chart showing an operation of the laser control circuit shown in FIG. 2.

FIG. 2 is a system block diagram showing a laser control circuit 55*a* and a peripheral constitution according to a first embodiment of the present invention. The laser control circuit 55*a* is the first embodiment of the laser control circuit 55 of FIG. 1. FIG. 3 is a time chart showing an operation of the laser control circuit 55*a*.

A horizontal synchronous sensor 61 detects the light beam scanned by the polygon mirror in an arrow direction in the figure. The horizontal synchronous sensor 61 is formed of a photoelectric conversion element (e.g., photo diode), and outputs a current in accordance with a received light amount. The horizontal synchronous sensor 61 is connected to a beam detection circuit 62. The beam detection circuit 62 converts an output current of the horizontal synchronous sensor 61 into a voltage signal, further binarizes the signal, and generates a horizontal synchronous signal BD indicating a passing timing of the light beam. The beam detection circuit 62 is connected to a synchronous circuit 70.

The image data processing unit 57 performs the above-described image processing with respect to the image data supplied from the scanner unit 300 or the external interface 59, and adds position data such as "right reference" and "left reference" in the PWM to the image data of each pixel in accordance with image processing result. The image data processed by the image data processing unit 57 comprises, for example, ten bits, 2 bits of them correspond to a pixel value indicating position data, and eight bits of them correspond to a pixel value indicating a pixel density.

The image data processing unit 57 outputs image data D1*a* to D4*a* in parallel with the synchronous circuit 70 (simultaneously). The image data D1*a* is left reference data of an odd pixel, the image data D2*a* is right reference data of the odd pixel, the image data D3*a* is left reference data of an even pixel, and the image data D4*a* is right reference data of the even pixel. The image data processing unit 57 is connected to the synchronous circuit 70.

The laser control circuit 55*a* of the present embodiment includes four pulse width modulation (PWM) circuits 81 to 84, the PWM circuit 81 generates a left reference pulse D1P of the odd pixel, the PWM circuit 82 generates a right reference pulse D2P of the odd pixel, the PWM circuit 83 generates a left reference pulse D3P of the even pixel, and the PWM circuit 84 generates a right reference pulse D4P of the even pixel. When there is not any change in position data of the image data supplied to each PWM circuit as in the present embodiment, the position data does not have to be added to the image data output from the image data processing unit 57. However, when a reference position of each PWM circuit is changed, for example, when the reference position of the PWM circuit 81 is changed to the right from the left, the position data needs to be added to the image data.

The synchronous circuit 70 synchronizes a reference clock CLK0 generated by a reference clock generation circuit 85 with the horizontal synchronous signal BD output from the beam detection circuit 62 to thereby generate a synchronized clock CLK1. A period of the clock CLK1 is T1, and a half period (T1/2) is T2. The synchronous circuit 70 synchronizes the image data D1*a* to D4*a* supplied from the image data processing unit 57 with the horizontal synchronous signal BD output from the beam detection circuit 62 to thereby synchronized image data D1*b* to D4*b*. The synchronous circuit 70 is connected to the PWM circuit 81, and delay circuits 71 to 73.

The delay circuits (DLY) 71 to 73 delays the CLK1, and outputs delayed clocks CLK2 to CLK4. The delay circuits 71 to 73 delay image data D2*b*, D3*b*, D4*b*, and output delayed image data D2*c*, D3*c*, D4*c*.

A delay amount of the delay circuit 71 is 0 in the present embodiment. Therefore, the clock CLK2 output from the delay circuit 71 is the same as the clock CLK1. As shown in FIG. 3, image data D2*c* output from the delay circuit 71 has the same timing as that of image data D1*b*, and changes to first data, second data, third data, fourth data, . . . .

The delay amount of the delay circuit 72 is the half period T2 of the clock CLK1. Therefore, the delay circuit 72 outputs a clock CLK3 obtained by delaying the clock CLK1 by the half period T2, and outputs the image data D3*c* obtained by delaying the image data D3*b*.

The delay amount of the delay circuit 73 is also the half period T2 of the clock CLK1. Therefore, a clock CLK4 output from the delay circuit 73 is the same as the clock CLK3. As shown in FIG. 3, image data D4*c* output from the delay circuit 73 has the same timing as that of image data D3*c*, and changes to first data, second data, third data, fourth data, . . . . To simplify the description hereinafter, the clock CLK2 is referred to as CLK1, and the clock CLK4 is referred to as CLK3. The delay circuit 71 is connected to the PWM circuit 82, the delay circuit 72 is connected to the PWM circuit 83, and the delay circuit 73 is connected to the PWM circuit 84.

Figure 4:
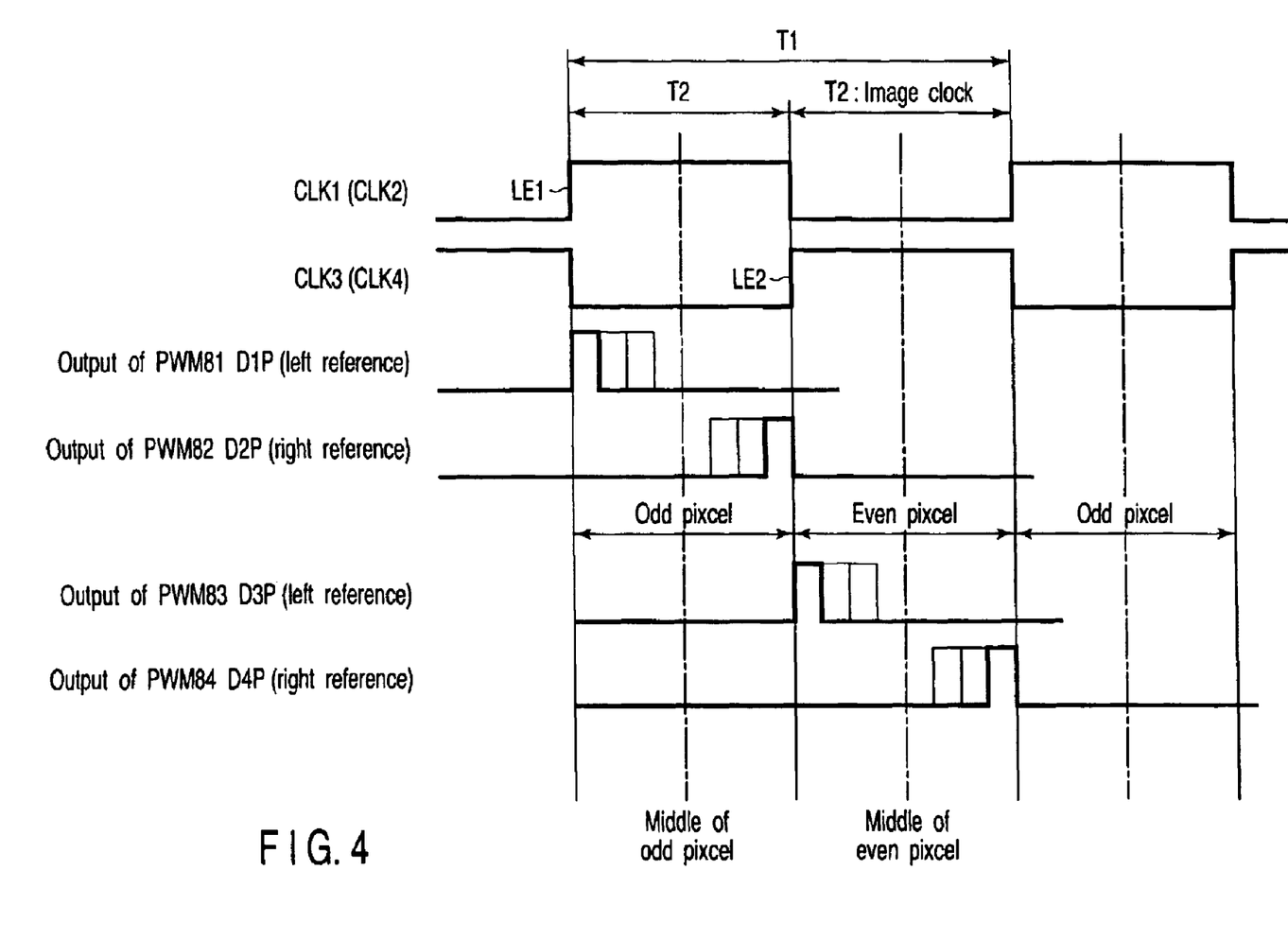
FIG. 4 is a time chart showing an output pulse of each PWM circuit.

FIG. 4 is a chart showing output pulses of the PWM circuits 81 to 84.

Here, transfer rates of the image data D1*a* to D4*a* supplied from the image data processing unit 57 are equal to that of a clock CLK0 (period: T1). Furthermore, in the present embodiment, an effective output period of each PWM circuit is a period T2 which is ½ of the input clock period T1. Therefore, a value of the image data supplied from the image data processing unit 57 is converted into a half value beforehand in the image data processing unit 57. For example, when the image data is FFh, the image data is converted into 80h in the image data processing unit 57, and supplied to the next stage.

As shown in FIG. 3, image data D3*c* and D4*c* of the even pixel are delayed by one pixel clock period T2 from the image data D1*b* and D2*c* of the odd pixel. The PWM circuit 81 outputs a pulse D1P having a width corresponding to that of the image data D1*b* with a left reference in response to a rising edge LE1 of the clock CLK1. The PWM circuit 82 outputs a pulse D2P having a width corresponding to that of the image data D3*c* with a right reference in response to the rising edge LE1 of the clock CLK1. The PWM circuit 83 outputs a pulse D3P having a width corresponding to that of the image data D3*c* with the left reference in response to a rising edge LE2 of the clock CLK3. The PWM circuit 84 outputs a pulse D4P having a width corresponding to that of the image data D4c with the right reference in response to the rising edge LE2 of the clock CLK3.

Therefore, as compared with a system in which a latter half of the pulse output with a middle reference is masked, in the present embodiment, since any mask period does not exist, a pixel does not extend to an adjacent pixel region. Therefore, a high-quality printed image is obtained.

A synthesis circuit (OR) 80 synthesizes (OR calculation) the pulses D1P to D4P, and outputs a pulse D5P. A laser driver turns ON/OFF of a laser diode (LD) in accordance with the pulse DSP. As a result, a light beam is generated in accordance with the image data.

Pixels (1) to (7), (9) of FIG. 3 show a state in which one of the pulses D1P and D2P, or one of the pulses D3P and D4P is output every image clock period T2. Here, a rate (frequency) of the clock CLK1 can be set to a rate equal to a maximum rated operation rate of the PWM. As a result, the pulse DSP output from the synthesis circuit 80 can be output at a rate which is twice the maximum rated operation rate of each PWM circuit.

Furthermore, in the present embodiment, a pulse can be output on the basis of both the right/left references for the image clock period T2 as in pixels (8), (10) to (14). That is, the frequency of the output pixel of the pulse D5P is four times that of CLK1 (maximum rated operation rate of PWM). Therefore, a precise high-quality image can be supplied as in the pixels (1) to (7), (9) as compared with the pulses on the basis of one of the right/left references is output for the image clock period T2.

Moreover, since it is possible to generate the light beam corresponding to each pixel in synchronization with the horizontal synchronous signal BD with good precision, a high-quality image can be formed without any image shift of a main scanning direction. Since an interval between the pixels can be set to be constant on the basis of the half period T2 of the clock CLK1 with good precision, a high-quality image can be formed without any positional shift between the pixel adjacent to each other in the main scanning direction.

Furthermore, when one PWM does not operate for some reason, the operation can be compensated by another PWM. For example, when the PWM of the left reference does not operate, the PWM of the right reference can be switched to the left reference, and used, and vice versa.

Figure 5:
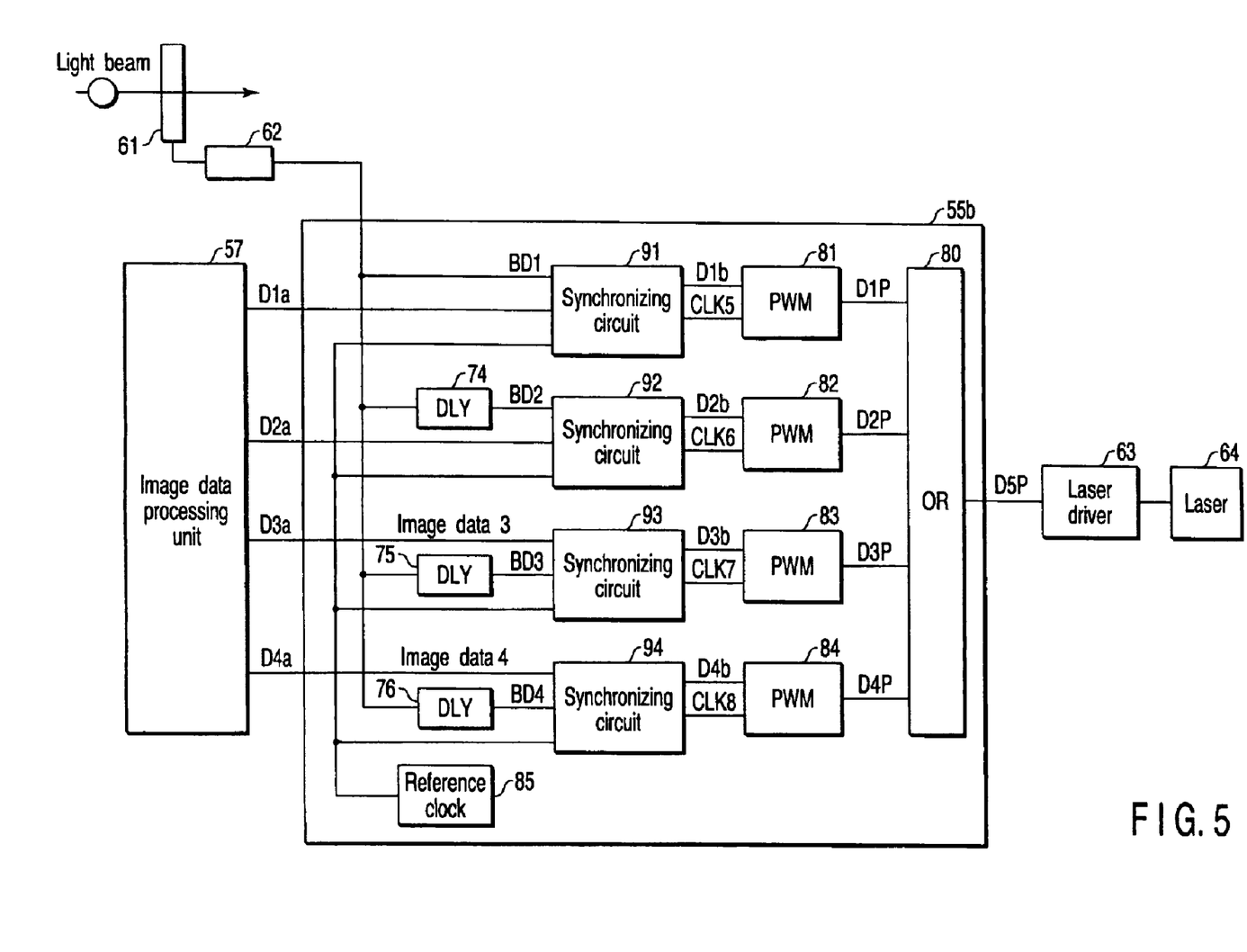
FIG. 5 is a block diagram showing constitutions of a laser control circuit and a peripheral circuit according to a second embodiment of the present invention.
Figure 6:
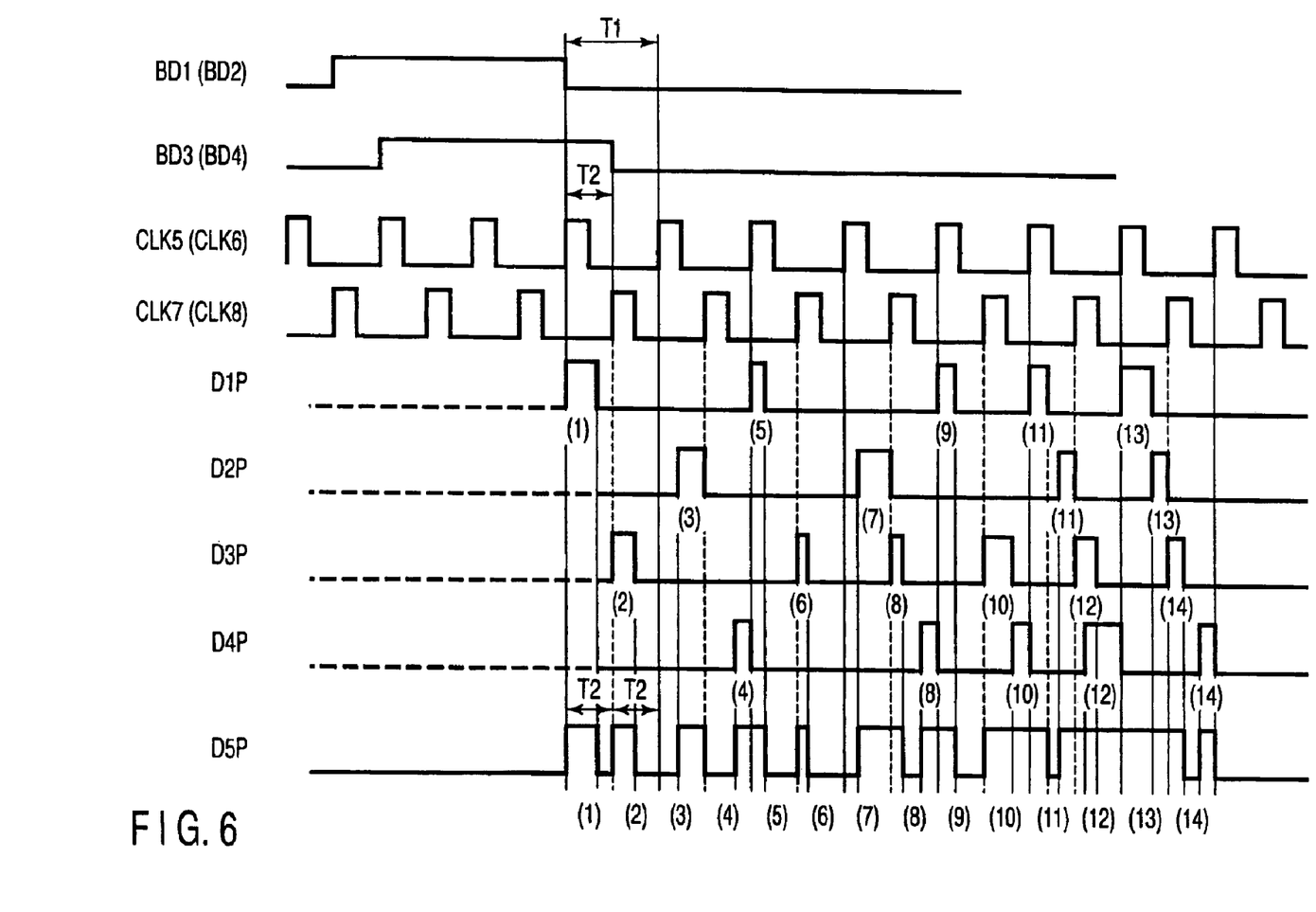
FIG. 6 is a time chart showing an operation of the laser control circuit shown in FIG. 5.

FIG. 5 is a block diagram showing constitutions of a laser control circuit 55b and a peripheral circuit according to a second embodiment of the laser control circuit 55 of FIG. 1, and FIG. 6 is a time chart showing an operation of the laser control circuit 55b. As compared with the laser control circuit 55a, a delay circuit is provided in a previous stage of a synchronous circuit in the laser control circuit 55b.

A beam detection circuit 62 is connected to a synchronous circuit 91 and delay circuits (DLY) 74 to 76. A horizontal synchronous signal BD1 from the beam detection circuit 62 is supplied to the synchronous circuit 91 and the delay circuits (DLY) 74 to 76. The delay circuit 74 delays the horizontal synchronous signal BD1 by a predetermined time, and outputs a delayed horizontal synchronous signal BD2. In the present embodiment, the delay amount of the delay circuit 74 is set to 0. Therefore, the horizontal synchronous signal BD2 is the same as the horizontal synchronous signal BD1.

The delay circuit 75 delays the horizontal synchronous signal BD2 by a predetermined time T2, and outputs a delayed horizontal synchronous signal BD3. The delay circuit 76 delays the horizontal synchronous signal BD1 by the predetermined time T2, and outputs a delayed horizontal synchronous signal BD4. Therefore, in the present embodiment, BD3 is identical to BD4. The predetermined time T2 is set to a half period of a reference clock CLK0. The delay circuits 74 to 76 are connected to synchronous circuits 92 to 94, respectively. The synchronous circuits 92 to 94 may be a common synchronous circuit.

The synchronous circuit 91 synchronizes the reference clock CLK0 generated by a reference clock generation circuit 85 with respect to the horizontal synchronous signal BD1, and supplies a synchronized clock CLK5. The synchronous circuit 92 synchronizes the reference clock CLK0 with respect to the synchronous signal BD2 output from the delay circuit 74, and supplies a synchronized clock CLK6. In the present embodiment, since the synchronous signal BD1 is identical to BD2, the clock CLK5 is identical to the clock CLK6.

The synchronous circuit 93 synchronizes the reference clock CLK0 with respect to the synchronous signal BD3 output from the delay circuit 75, and supplies a synchronized clock CLK7. The synchronous circuit 94 synchronizes the reference clock CLK0 with respect to the synchronous signal BD4 output from the delay circuit 76, and supplies a synchronized clock CLK8. In the present embodiment, since the synchronous signal BD3 is identical to BD4, the clock CLK7 is identical to the clock CLK8. The synchronous circuits 91 to 94 are connected to PWM circuits 81 to 84.

Operations of the PWM circuits 81 to 84, a synthesis circuit 80, a laser driver 63, and a laser diode 64 are similar to those of the first embodiment of FIG. 2.

As shown in FIG. 6, also in the second embodiment, an output pixel frequency of a pulse D5P is, for example, twice that of CLK1 (maximum rated operation rate of PWM) as in pixels (1) to (7), (9). Pulses on the basis of both right/left references can be output for a half period T2 as in pixels (8), (10) to (14). In this case, the output pixel frequency is four times the maximum rated operation rate of PWM. Therefore, as compared with a pulse on the basis of one of the right/left references is output for the half period T2, a fine high-quality image can be supplied.

The above description is the embodiments of the present invention, and the apparatus and the method of the present invention are not limited thereto, and various modified examples can be implemented. Such modified examples are included in the present invention. Further, apparatuses or methods which are configured by appropriately combining the components, the functions, the features, or the steps of the method in the respective embodiments are included in the present invention.

What is claimed is:

1. A laser control circuit comprising:
    a clock generation circuit which generates a reference clock signal;
    a first synchronous circuit which includes a beam detection circuit detecting a light beam scanned in a main scanning direction and supplying a horizontal synchronous signal, and which supplies a first clock synchronized with the horizontal synchronous signal, on a basis of a reference clock signal from the clock generation circuit;
    a delay circuit which supplies a delayed horizontal synchronous signal obtained by delaying the horizontal synchronous signal by a half period of the first clock;
    a second synchronous circuit which supplies a second clock synchronized with the delayed horizontal synchronous signal on a basis of the reference clock signal;
    an image data processing section which subjects input image data to image processing and which outputs first to fourth image data in parallel;

a first pulse width modulation circuit which outputs a pulse having a width corresponding to the first image data as an odd-numbered pixel with a left reference in accordance with the first clock;

a second pulse width modulation circuit which outputs a pulse having a width corresponding to the second image data as an odd-numbered pixel with a right reference in accordance with the first clock;

a third pulse width modulation circuit which outputs a pulse having a width corresponding to the third image data as an even-numbered pixel with the left reference in accordance with the second clock;

a fourth pulse width modulation circuit which outputs a pulse having a width corresponding to the fourth image data as an even-numbered pixel with the right reference in accordance with the second clock;

a synthesis circuit which synthesizes the pulses output from the first to fourth pulse width modulation circuits; and a laser which emits a light beam in accordance with the pulse synthesized by the synthesis circuit.

2. The laser control circuit according to claim 1, wherein the pulse is output from one circuit of the first and second pulse width modulation circuits for a half period of the first clock, and the pulse is output from one circuit of the third and forth pulse width modulation circuits for a half period of the second clock in accordance with an instruction of the image data processing section.

3. The laser control circuit according to claim 1, wherein the pulses are output from both the circuits of the first and second pulse width modulation circuits for a half period of the first clock, and the pulses are output from both the circuits of the third and forth pulse width modulation circuits for a half period of the second clock in accordance with an instruction of the image data processing section.

4. An image forming apparatus comprising:

a clock generation circuit which generates a reference clock signal;

a first synchronous circuit which includes a beam detection circuit detecting a light beam scanned in a main scanning direction and supplying a horizontal synchronous signal, and which supplies a first clock synchronized with the horizontal synchronous signal, on a basis of a reference clock signal from the clock generation circuit;

a delay circuit which supplies a delayed horizontal synchronous signal obtained by delaying the horizontal synchronous signal by a half period of the first clock;

a second synchronous circuit which supplies a second clock synchronized with the delayed horizontal synchronous signal on a basis of the reference clock signal;

an image data processing section which subjects input image data to image processing and which outputs first to fourth image data in parallel;

a first pulse width modulation circuit which outputs a pulse having a width corresponding to the first image data as an odd-numbered pixel with a left reference in accordance with the first clock;

a second pulse width modulation circuit which outputs a pulse having a width corresponding to the second image data as an odd-numbered pixel with a right reference in accordance with the first clock;

a third pulse width modulation circuit which outputs a pulse having a width corresponding to the third image data as an even-numbered pixel with the left reference in accordance with the second clock;

a fourth pulse width modulation circuit which outputs a pulse having a width corresponding to the fourth image data as an even-numbered pixel with the right reference in accordance with the second clock;

a synthesis circuit which synthesizes the pulses output from the first to fourth pulse width modulation circuits; and a laser which emits a light beam in accordance with the pulse synthesized by the synthesis circuit; and an image forming section which forms an image on a basis of the light beam emitted by the laser.

5. The image forming apparatus according to claim 4, wherein the pulse is output from one circuit of the first and second pulse width modulation circuits for a half period of the first clock, and the pulse is output from one circuit of the third and forth pulse width modulation circuits for a half period of the second clock in accordance with an instruction of the image data processing section.

6. The image forming apparatus according to claim 4, wherein the pulses are output from both the circuits of the first and second pulse width modulation circuits for a half period of the first clock, and the pulses are output from both the circuits of the third and forth pulse width modulation circuits for a half period of the second clock in accordance with an instruction of the image data processing section.

* * * * *